United States Patent
Weatherley

(10) Patent No.: US 6,326,542 B1
(45) Date of Patent: Dec. 4, 2001

(54) METHOD OF REDUCING SKEW IN SIGNAL CARRYING CABLES, AND SIGNAL CARRYING CABLE UTILIZING SUCH METHOD

(76) Inventor: Richard Weatherley, 43-45 Salthouse Rd., Cornwell Business Park, Brackmills, Northampton NN4 7EX (GB)

( * ) Notice: Subject to any disclaimer, the term of this patent is extended or adjusted under 35 U.S.C. 154(b) by 0 days.

(21) Appl. No.: 09/485,910
(22) PCT Filed: Aug. 21, 1998
(86) PCT No.: PCT/GB98/02536
  § 371 Date: Feb. 18, 2000
  § 102(e) Date: Feb. 18, 2000
(87) PCT Pub. No.: WO99/10989
  PCT Pub. Date: Mar. 4, 1999

(30) Foreign Application Priority Data

Aug. 22, 1997 (GB) .................................. 9717976

(51) Int. Cl.$^7$ .................................................. H01B 11/02
(52) U.S. Cl. .......................................... 174/27; 174/113 R
(58) Field of Search .................... 174/27, 32, 36, 174/34, 113 R; 714/700, 712, 814, 815

(56) References Cited

U.S. PATENT DOCUMENTS 6,066,799 * 5/2000 Nugent .................................. 174/27

FOREIGN PATENT DOCUMENTS

| 0 556 579 | * | 8/1993 | (EP) . |
| 7-209563 | * | 8/1995 | (JP) . |
| WO 97 27679 | * | 7/1997 | (WO) . |

* cited by examiner

*Primary Examiner*—Chau N. Nguyen
(74) *Attorney, Agent, or Firm*—Dykema Gossett PLLC

(57) ABSTRACT

A method of reducing or eliminating skew between signals of first and second conductors of a data cable by transferring the signal of the first conductor to the second conductor at a position intermediate the ends of the data cable and transferring the signal of the second conductor to the first conductor at a position intermediate the ends of the data cable. The transferring of the signals in such that, in traveling the length of the cable, any one of the signals travels partly on the first conductor and partly on the second conductor. The first and second conductors are a twisted pair of first conductors and a twisted pair of second conductors.

7 Claims, 1 Drawing Sheet

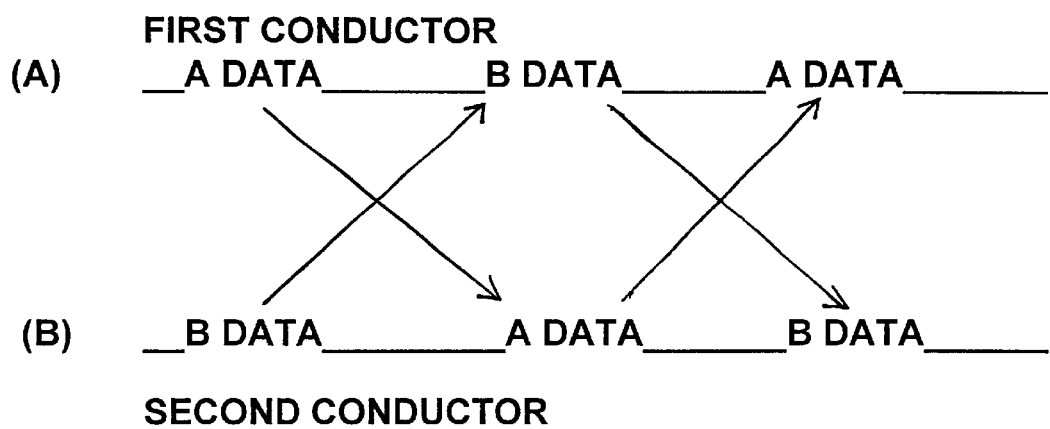

METHOD OF REDUCING SKEW IN SIGNAL CARRYING CABLES, AND SIGNAL CARRYING CABLE UTILIZING SUCH METHOD

BACKGROUND OF THE INVENTION

This invention relates to a method of reducing "skew" in data carrying cables, and to cables and data installation in which the method of the present invention is used to reduce skew to an acceptable level.

For the purposes of data transmission, cables comprising a plurality of pairs of conductors are frequently used. Each conductor is separately insulated and each pair of conductors is twisted together to form a so-called "twisted pair". The "twist-rate" (that is the number of twists per unit length) of each pair is deliberately different from that of each other pair so as to reduce cross-talk between the pairs. The effect of this variation in twist rate is that for any given length of cable the length of the conductors forming each twisted pair will be different from the length of conductors forming each other twisted pair. As a result of this length variation, signals applied simultaneously to the twisted pairs at one end of the cable will arrive at different times at the other end of the cable. This characteristic is known as "skew".

By way of example, the transit time for signals injected simultaneously on two different pairs of a typical commercial Category 5 (100 MHz) cable containing four twisted pairs and a length of 100 m may typically vary by 20 ns (20 nano seconds). Such variation in transit time renders cables of this length unacceptable for high frequency data transmission, and in particular, such cables are totally unacceptable for so-called "gigabit ethernet" systems.

With a view to avoiding this problem, special cables have been produced for high speed data transmission. Such cables are of complex construction and typically include individually shielded conductors which are bonded together in a manner in eliminate length variations of the conductors within a given length of cable. Such cables are expensive and difficult to use because of their limited flexibility and because of the relative complexity of forming terminations on the cables.

SUMMARY OF THE INVENTION

We have now devised a method which substantially reduces or eliminates skew between the twisted pairs of a conventional cable which incorporates a plurality of twisted pairs, for example, a conventional Category 5 data cable.

A method of reducing or eliminating skew between signals of first and second conductors of a data cable, the method comprising steps of transferring the signal of the first conductor from the first conductor to the second conductor at a position intermediate the ends of the data cable and transferring the signal of the second conductor from the second conductor to the first conductor at a position intermediate the ends of the data cable, the transferring of the signals being such that, in travelling the length of the cable, any one of said signals travels partly on the first conductor and partly on the second conductor, wherein the first and second conductors each comprise a twisted pair of first conductors and a twisted pair of second conductors.

DESCRIPTION OF THE DRAWING

The drawing schematically illustrates a method of reducing skew between twisted pairs of conductors.

DESCRIPTION OF THE INVENTION

According to one aspect of the present invention a method of reducing or eliminating skew between a first pair of conductors and a second pair of conductors of a data cable comprises transferring the signal from the first pair of conductors to the second pair of conductors at a point intermediate the ends of the cable and transferring the signal from the second pair of conductors to the first pair of conductors at a point intermediate the ends of the cable so that in travelling the length of the cable any given signal travels partly on the first pair of conductors and partly on the second pair of conductors.

Generally, if the transistor of signals is effected midway along the length of the cable skew between the relevant conductor pairs will be substantially eliminated and signals injected simultaneously into the first pair and the second pair at one end of the cable will arrive simultaneously on the second pair and the first pair respectively at the other end of the cable.

In order to preserve the polarity of the cabling system— i.e. in order to ensure that a signal injected into a particular colour coded pair of conductors at one end of the cable arrives on the same colour coded pair of conductors at the other end of the cable, a second swapping of the signals is preferably provided. This second swapping of the signal can occur at a point intermediate the ends of the cable. For example, the signal can be swapped from one pair of conductors to the other pair of conductors at a distance one quarter of the length of the cable from one end, and the signal can be swapped back at a point one quarter of the length of the cable from the other end. With such an arrangement, the polarity of the cabling is maintained but each signal travels for half of its journey on one pair of conductors, and for the other half of its journey on the other pair of conductors. Preferably, however, the "swapping-back" of the signals is effected at or adjacent to one termination of the cable. Under these circumstances, one swapping over can be effected in the middle of the cable, and the other swapping over effected at one end of the cable.

If the cable includes more than one pair of twisted pairs, the signals of all pairs are preferably swapped in order to produce the required elimination of skew. It has been found in a standard Category 5 cable having four twisted pairs that the necessary substantial reduction or elimination of skew can be achieved by swapping the signal travelling along the fastest pair with the signal travelling along the slowest pair and swapping the signal travelling along the next-to-fastest pair with the signal travelling along the next-to-slowest pair. The effect of this swapping is to substantially eliminate skew, the overall transit time being substantially equal to the average of the transit times of the four pairs.

The invention may be put into effect by supplying a cable in which the required swapping of signals has already been provided for at a pre-installation stage, or by effecting the necessary swapping as part of the cable installation procedure. In the former case, a particular length of cable required for a particular installation, for example a cable of 100 m, will be measured to determine the skew of transit times between the respective pairs. The cable will then typically be cut halfway along its length and the necessary connection of the various conductors made. If desired, a swapping back of the conductors may be effected adjacent one end of the cable to preserve polarity of the cable as outlined above. The resultant cable will exhibit substantially no skew and can be installed as required.

If the second method of employing the invention is used, a length of cable will be installed and the skew measured in situ using appropriate skew measuring apparatus. The cable will then be cut at one or more points and the conductors reconnected as described above in order to substantially reduce or eliminate the skew present between the respective pairs.

Although the present invention is particularly applicable to reducing or eliminating the skew between the ends of a single cable, the method can be used to eliminate or reduce the skew between the ends of a cable which itself is made up of two or more discreet lengths of cable. For example, a cable of 100 m length may be made up from two lengths of cable each 50 m long. In accordance with the present invention, the skew of each such 50 m length of cable will be determined and the two cable lengths will be connected together in a manner which connects the pair having the highest skew from one cable to the pair having the lowest skew from the other cable (and so on if there is more than one pair of pairs of conductors present). Although under these circumstances the skew is not likely to be totally eliminated, a very significant reduction in skew can be obtained.

The preferred means of effecting the invention is to connect the end of each cable part, at the point of cut, to a respective IDC connector, and to connect the terminals of the IDC connectors together in a manner to provide the necessary swapping of the signals. Appropriate means may be employed at the point of connection to limited the cross-talk introduced by this operation. Alternatively, each cable end may be provided with a conventional plug and the plugs connected together with a socket-to-socket connector. The necessary swapping of the signals is effected by the connections within the connector. Such connectors could be pre-formed whereby a range of connectors would provide for all possible signal swapping arrangements, or could be produced specifically for a particular swap by appropriate internal wiring specific to the swap required.

It will be appreciated that whilst the present invention is of particular relevance to cable used in high frequency data transmission, for example gigabit ethernet cable, the invention may have other and more general applications where the elimination of Skew between different pairs of conductors is necessary or desirable.

Further, it is believed that the present invention may be utilized to eliminate skew between the individual conductors of a particular pair of conductors. Because of variations in conductors length and other factors there may, in fact, be a variation in transit time between the conductors making up each particular pair of a conductors. This variation in transit time may be very small, but may become critical at high frequencies. It is believed that by appropriate swapping of signals it may be possible to eliminate not only the skew between different pairs, but also the skew between different conductors of each pair by use of the techniques of the present invention.

A further advantage provided by the present invention is that the substantial elimination of skew has the effect of reducing the cross-talk between the various conductor pairs. This is believed to be because of a reduction in electromagnetic emissions which results from the substantial elimination of phase differences between the different signals travelling along the cable. The reduction of cross-talk is a substantial advantage provided by the present invention.

What is claimed is:

1. A method of reducing or eliminating skew between signals of first and second conductors of a data cable, the method comprising steps of:

transferring the signal of the first conductor from the first conductor to the second conductor at a position intermediate the ends of the data cable; and transferring the signal of the second conductor from the second conductor to the first conductor at a position intermediate the ends of the data cable, the transferring of the signals being such that, in travelling the length of the cable, any one of said signals travels partly on the first conductor and partly on the second conductor, wherein the first and second conductors each comprises a twisted pair of first conductors and a twisted pair of second conductors.

2. A method as claimed in claim 1 comprising the further steps of:

transferring the signal of the first conductor from the second conductor to the first conductor at a position intermediate the ends of the data cable; and transferring the signal of the second conductor from the first conductor to the second conductor at a position intermediate the ends of the data cable.

3. A method as claimed in claim 2, wherein the intermediate position at which the signal of the first conductor is transferred to the first conductor is coincident with the intermediate position at which the signal of the second conductor is transferred to the second conductor, said intermediate positions being at or adjacent a termination of the data cable.

4. A method as claimed in claim 1, wherein the intermediate position at which the signal of the first conductor is transferred to the second conductor is coincident with the intermediate position at which the signal of the second conductor is transferred to the first conductor, said intermediate positions being located midway along the length of the data cable.

5. A signal carrying data cable comprising first and second conductors and utilizing the method claimed in claim 1.

6. A signal carrying data cable as claimed in claim 5, wherein the signal of the first conductor and the signal of the second conductor are transferred by means of a corresponding connection between the conductors.

7. A signal carrying data cable as claimed in claim 1, wherein skew between signals of the first and second conductors is reduced or eliminated.

* * * * *